(12) United States Patent
Lv et al.

(10) Patent No.: US 11,709,596 B2
(45) Date of Patent: Jul. 25, 2023

(54) METHOD, DEVICE AND COMPUTER PROGRAM FOR DATA STORAGE

(71) Applicant: EMC IP Holding Company LLC, Hopkinton, MA (US)

(72) Inventors: Shuo Lv, Beijing (CN); Leihu Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/025,306

(22) Filed: Sep. 18, 2020

(65) Prior Publication Data

US 2021/0303153 A1  Sep. 30, 2021

(30) Foreign Application Priority Data

Mar. 26, 2020 (CN) .......................... 202010225026.1

(51) Int. Cl.
*G06F 3/06* (2006.01)
(52) U.S. Cl.
CPC .............. *G06F 3/061* (2013.01); *G06F 3/064* (2013.01); *G06F 3/0659* (2013.01); *G06F 3/0679* (2013.01)
(58) Field of Classification Search
USPC ........................................................ 711/103
See application file for complete search history.

(56) References Cited

U.S. PATENT DOCUMENTS

| 9,904,480 | B1* | 2/2018 | Singh .................... G06F 3/0641 |
| 10,498,355 | B2 | 12/2019 | Hong et al. |
| 10,691,879 | B2 | 6/2020 | Wu et al. |
| 10,809,932 | B1* | 10/2020 | Armangau ............ G06F 3/0608 |
| 10,877,691 | B2* | 12/2020 | Barczak ................ G06F 3/0635 |
| 2009/0327607 | A1* | 12/2009 | Tetrick ................ G06F 12/0888 |
| | | | 711/E12.001 |
| 2016/0358657 | A1* | 12/2016 | Kim ...................... G11C 16/10 |
| 2018/0121090 | A1* | 5/2018 | Choi ...................... G06F 3/0616 |
| 2018/0322042 | A1* | 11/2018 | Jang ...................... G06F 3/061 |
| 2019/0018784 | A1* | 1/2019 | Ishii .................... G06F 12/0246 |
| 2019/0196713 | A9* | 6/2019 | Yang .................... G06F 3/0655 |
| 2019/0205062 | A1* | 7/2019 | Sun ...................... G06F 3/0611 |

FOREIGN PATENT DOCUMENTS

| CN | 107908366 A | * | 4/2018 | ........... G06F 3/0611 |
| CN | 109976664 A | * | 7/2019 | |

OTHER PUBLICATIONS

J. U. Kang, J. Hyun, H. Maeng and S. Cho, "The multi-streamed solid-state drive", Proc. 6th USENIX Workshop Hot Topics Storage File Syst. (HotStorage), pp. 13, 2014. (Year: 2014).*

* cited by examiner

*Primary Examiner* — Sanjiv Shah
*Assistant Examiner* — Elias Young Kim
(74) *Attorney, Agent, or Firm* — BainwoodHuang

(57) ABSTRACT

Techniques involve: selecting a stream from a plurality of streams having respective update frequencies, the update frequency of the selected stream matching an update frequency of to-be-written data; determining a label of the data based on a label of the selected stream; and sending a write request for the data to a storage system, the write request comprising the label of the data, so that the storage system performs a write operation for the data based on the stream identified by the label. Accordingly, a write amplification factor can be reduced, thereby increasing the effective life of a storage device and improving read and write performance of the storage system.

15 Claims, 4 Drawing Sheets

METHOD, DEVICE AND COMPUTER PROGRAM FOR DATA STORAGE

CROSS-REFERENCE TO RELATED APPLICATION

This application claims priority to Chinese Patent Application No. CN202010225026.1, on file at the China National Intellectual Property Administration (CNIPA), having a filing date of Mar. 26, 2020 and having "METHOD, DEVICE AND COMPUTER PROGRAM FOR DATA STORAGE" as a title, the contents and teachings of which are herein incorporated by reference in their entirety.

TECHNICAL FIELD

Embodiments of the present disclosure generally relate to storage systems, and in particular, to a method, a device, and a computer program for data storage.

BACKGROUND

With increasingly high requirements on read and write performance, a solid-state storage device (SSD) such as a NAND flash memory has been widely used. However, there is generally a problem of write amplification in the SSD, which affects the service life of the SSD. In addition, a garbage collection (GC) operation also needs to be performed on the SSD, which will result in an additional overhead, thereby degrading the system performance. Such problems may also exist in other types of storage devices than the SSD.

SUMMARY OF THE INVENTION

A method, a device, a computer-readable storage medium, and a computer program product for data storage are provided in the embodiments of the present disclosure.

In a first aspect, a method for data storage is provided. The method includes: selecting a stream from a plurality of streams having respective update frequencies, the update frequency of the selected stream matching an update frequency of to-be-written data; determining a label of the data based on a label of the selected stream; and sending a write request for the data to a storage system, the write request including the label of the data, so that the storage system performs a write operation for the data based on the stream identified by the label.

In a second aspect, an electronic device is provided. The electronic device includes: a processor; and a memory coupled to the processor and including instructions stored thereon, wherein when executed by the processor, the instructions cause the electronic device to perform actions including: selecting a stream from a plurality of streams having respective update frequencies, the update frequency of the selected stream matching an update frequency of to-be-written data; determining a label of the data based on a label of the selected stream; and sending a write request for the data to a storage system, the write request including the label of the data, so that the storage system performs a write operation for the data based on the stream identified by the label.

In a third aspect, a computer-readable storage medium having machine-executable instructions stored thereon is provided, wherein when executed by at least one processor, the machine-executable instructions cause the at least one processor to implement the method according to the first aspect.

In a fourth aspect, a computer program product is provided. The computer program product is stored in a computer-readable medium and includes machine-executable instructions, wherein when executed, the machine-executable instructions cause a machine to perform the method according to the first aspect.

In a fifth aspect, a computer program is provided. When executed by at least one processor, the computer program causes the at least one processor to perform the method according to the first aspect.

The summary is provided to introduce the choice of concepts in a simplified form, which will be further described in the following Detailed Description. The summary is neither intended to identify key features or major features of the present disclosure, nor intended to limit the scope of the present disclosure.

BRIEF DESCRIPTION OF THE DRAWINGS

The above and other objectives, features, and advantages of the present disclosure will become more obvious by describing example embodiments of the present disclosure in more detail with reference to the accompanying drawings. In the example embodiments of the present disclosure, the same reference numerals generally represent the same members.

DETAILED DESCRIPTION

Figure 1:
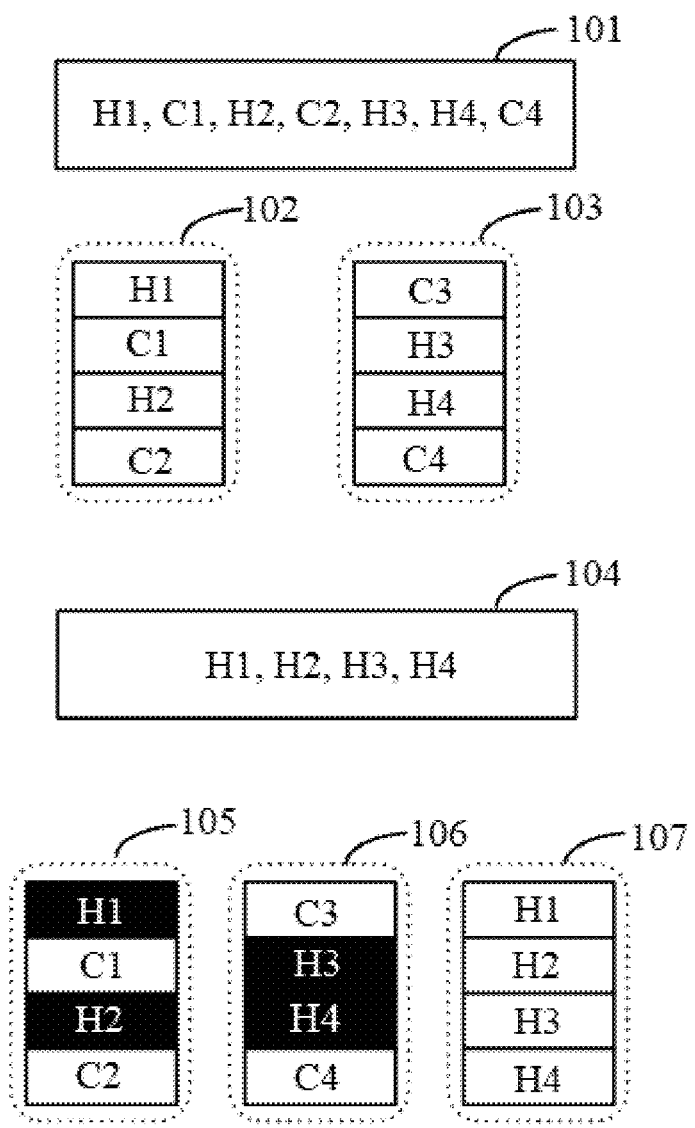
FIG. 1 is a schematic block diagram of performing a conventional write operation in a storage system.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be appreciated that the present disclosure may be implemented in various forms and should not be limited by the embodiments described here. In contrast, the embodiments are provided to make the present disclosure more thorough and complete, and the scope of the present disclosure may be fully conveyed to those skilled in the art.

The term "include" and its variants as used herein indicate open inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

For ease of description only, some embodiments of the present disclosure will be described in an SDD environment. However, it should be appreciated that this is not intended to limit the scope of the present disclosure in any way. The principles and ideas described here are applicable to other appropriate technologies or environments that are currently known or will be developed in the future.

As described above, there is a problem of write amplification in an SSD. This problem will be described in detail now. The unit of a write operation in the SSD is page, which is typically 2-64 KB in size. A NAND flash memory has to perform an erase operation on a page before a write operation is performed on the page. However, the unit of the erase operation is block, and one block typically includes 32-256 pages.

The erase operation is relatively time-consuming, and therefore, when a modify operation is performed on a page, modified data is generally written directly to a new page that has been erased, and the old page is set to an invalid state. At this moment, the modify operation on the page is considered completed. Afterwards, a flash transfer layer (FTL) of the SSD may perform a garbage collection (GC) algorithm to reclaim pages in an invalid state.

The FTL needs to perform an erase operation on the invalid pages to reclaim them, and the unit of the erase operation is block. One block includes a plurality of pages, including both invalid and valid pages. Therefore, when the FTL needs to reclaim invalid pages in block A, it has to first copy valid pages in block A to another new block (such as block B) and set the valid pages in block A to an invalid state. In this case, all pages in block A are in the invalid state, and the FTL can safely perform an erase operation on block A.

During the above operation, the FTL needs to additionally copy the valid pages in the reclaimed block so that the number of IOs actually executed by a device is greater than the number of IOs submitted by a user. Such a characteristic is referred to as "write amplification."

In technologies such as SSD, such a characteristic is described using a "write amplification factor" (WAF). The value of the parameter is set to a ratio of the number of write operations submitted to a flash memory to the number of write operations from a host. The FTL needs to additionally copy the valid pages, and therefore, the value of the WAF parameter is generally greater than 1.

The WAF parameter may affect the service life of the SSD. In general, a larger value of the WAF will result in a shorter actual effective life of the SSD. In addition, the WAF parameter may also affect the performance of read and write operations of the SSD. The GC operation is generally run in the background, so when the load is light, the GC operation generally does not affect the read and write operations. However, when the load is heavy, the write operation needs to wait for the GC algorithm to release idle pages, which reduces the write performance. At the same time, the read operation may be run in parallel with the GC operation to compete for resources, which increases read latency.

FIG. 1 is a schematic block diagram of performing a conventional write operation in a storage system. In the example, it is assumed that there are currently two types of data, i.e., hot data (H) and cold data (C), wherein the hot data is updated more frequently than the cold data. In other words, the life cycle of the hot data is shorter than that of the cold data.

In a regular SSD FTL implementation, after an operating system submits a write operation request to the SSD, the FTL will write the data submitted by the operating system to available blocks in sequence. For example, as shown in FIG. 1, the operating system submits write operation sequence 101, including H1, C1, H2, C2, C3, H3, H4, and C4. The FTL writes the data to block 102 and block 103 (assuming that one block includes four pages) in sequence.

Then, the operating system submits write operation sequence 104. When hot data H1, H2, H3 and H4 is modified, the modified data has to be written to block 107, and H1 and H2 pages in block 102 as well as H3 and H4 pages in block 103 are set to invalid, which are represented as blocks 105 and 106. Then, when the GC needs to reclaim blocks 105 and 106 (that is, blocks 102 and 103), valid pages C1, C2, C3, and C4 therein need to be additionally copied.

Figure 2:
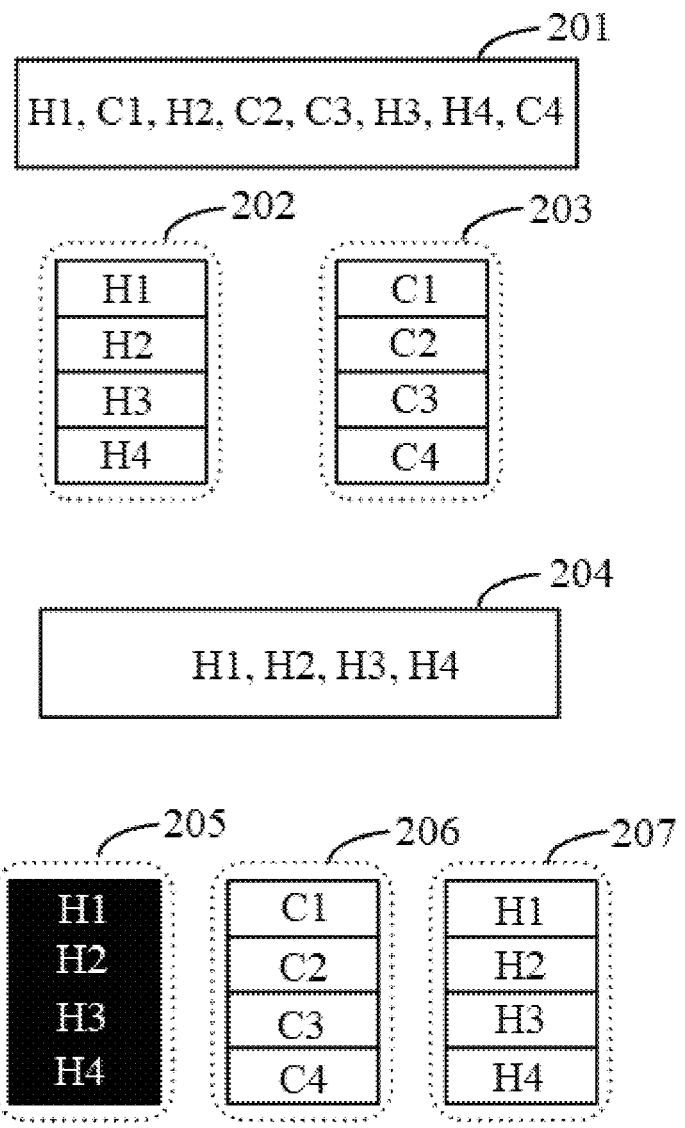
FIG. 2 is a schematic block diagram of performing a multi-stream write operation in a storage system.

FIG. 2 is a schematic block diagram of performing a multi-stream write operation in a storage system. When an SSD FTL supports a multi-stream write technology, the operating system can bind written data to a certain stream, for example, bind hot data (H) to stream x and cold data (C) to stream y. In this case, the FTL writes data from different streams to different blocks respectively when handling a write request submitted by the operating system. For example, as shown in FIG. 2, for write operation sequence 201, stream x (hot data) is all written to block 202 and stream y (cold data) is all written to block 203.

Then, the operating system submits write operation sequence 204. When hot data H1, H2, H3 and H4 is modified, the FTL writes the modified data to block 207. In this case, block 202 does not include any valid pages, and is represented as block 205; in addition, block 203 remains unchanged, and is represented as block 206. Then, the GC can perform an erase operation directly on block 205 without incurring an additional copy operation.

Through the multi-stream write technology, data at different update frequencies is written to different blocks so as to minimize additional data copy operations introduced in the GC, thus increasing the effective life of the SSD and improving the write performance.

The essence of the multi-stream write technology is to provide, for a special write characteristic of a solid-state storage device such as a flash memory, a mechanism for writing data at different update frequencies to different blocks. In the multi-stream mechanism, data at different update frequencies are abstracted using streams and different streams are identified using stream IDs.

A storage device (such as an SSD) masters very little information and has little idea of an update frequency of the data. Only upper-layer software (including a user program and an operating system) that produces the data knows the update frequency of the data. Therefore, the upper-layer software is responsible for mapping between the written data and the stream IDs, an interface protocol is responsible for passing the data and the stream IDs to the SSD device, and the SSD FTL is only responsible for writing the data with different stream IDs to different blocks.

The SSD device supports a variety of interface protocols. At present, a small computer interface (SCSI) (T10 (SCSI) standard) and a fast non-volatile memory (NVMe) (for example, NVMe 1.3) have officially supported multi-stream characteristics. For example, the FTL of the SSD can be responsible for mapping between a logical block address (LBA) used by the operating system and a physical address used by the SSD internally.

A conventional SSD FTL not supporting the multi-stream mechanism generally maintains only a log structure, which may only store IO requests in an available storage space sequentially in an order of the IO requests submitted by the operating system.

An SSD FTL supporting the multi-stream mechanism may maintain a plurality of journal structures, wherein a separate journal structure is maintained for each stream. The FTL allocates a storage space in a stream granularity size (SGS). That is, the FTL may initially pre-allocate an SGS-sized storage block to each stream, and then data of the stream may be stored in this pre-allocated SGS-sized storage block. When the space of the storage block runs out, the FTL re-allocates an SGS-sized storage block. A journal structure of a stream may maintain all the storage blocks allocated to the stream, and all these SGS-sized storage blocks make up a stream. For example, the multi-stream mechanism can be supported in a directive form, which is configured to achieve information communication between the SSD device and the upper-layer software. A stream is only a subset of the directive.

Figure 3:
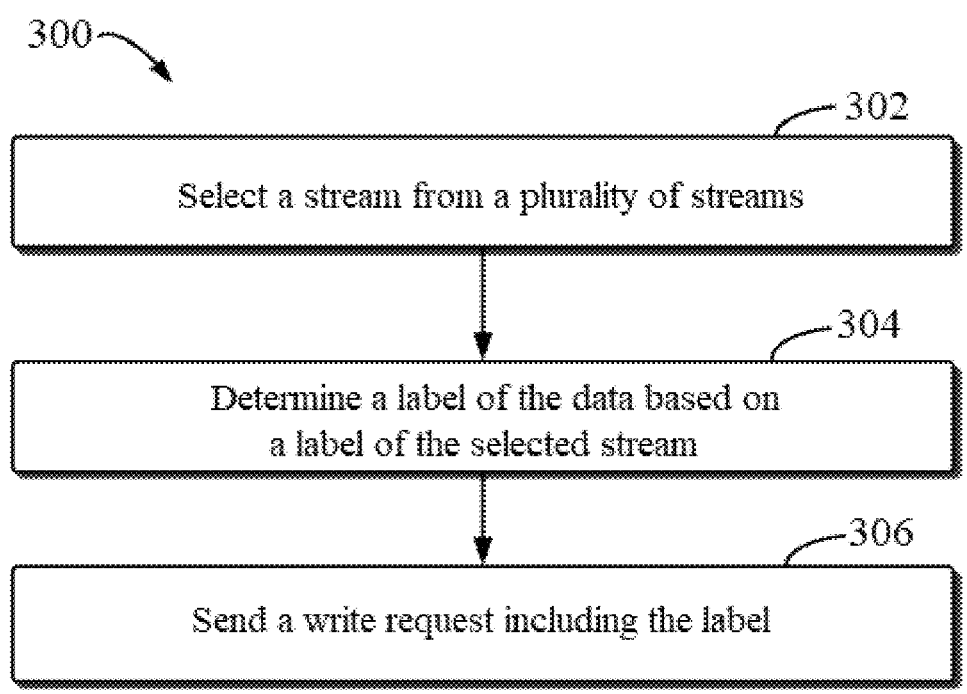
FIG. 3 is a flowchart of a method for data storage according to some embodiments of the present disclosure.

FIG. 3 is a flowchart of method 300 for data storage according to an embodiment of the present disclosure. For example, method 300 is applicable to the multi-stream write operation shown in FIG. 2.

In block 302, a stream is selected from a plurality of streams having respective update frequencies, the update frequency of the selected stream matching an update frequency of to-be-written data. For example, in the example as shown in FIG. 2, if a piece of data is hot data, stream x is selected from streams x and y.

In some embodiments, the data may include metadata. Different types of metadata may be associated with their update frequencies or life cycles, and therefore, the stream can be selected according to a type of the metadata. For example, four streams can be defined, each of which has a corresponding update frequency or a type of metadata. For example, a first stream corresponding to a journal, a second stream corresponds to a virtual block mapping (VBM), a third stream corresponds to an indirect block (IB), and a fourth stream corresponds to a superblock, a bitmap, or a per-block metadata (BMD). From the first stream to the fourth stream, the update frequency increases successively. For example, stream IDs from the first stream to the fourth stream may be defined as 1 to 4, respectively.

In block 304, a label of the data is determined based on a label of the selected stream. For example, if a label of stream x is x or 1, a label of the to-be-written data can be determined as x or 1. In the example of the metadata example as described above, the label of the stream can be a stream ID or a variable corresponding to the stream ID.

In block 306, a write request for the data is sent to a storage system, the write request including the label of the data, so that the storage system performs a write operation for the data based on the stream identified by the label. The storage system supports the multi-stream write technology, which may be, for example, an SSD, especially an SSD with an NVMe interface. If based on the label in the data, the storage system can perform an operation of a corresponding stream. For example, data from the same stream can be stored in the same area, thus reducing the frequency of data copy and accordingly reducing a write magnification factor. In this way, the service life and performance of the storage system can be improved.

An example embodiment of the present disclosure will be described below in conjunction with a common block file system (CBFS). In the example embodiment, a variety of metadata and file data in the CBFS are mapped to different stream IDs so that different data is stored separately in the SSD (such as an NVMe SSD). For example, such separate storage can be achieved by binding different types of metadata and file data to different stream IDs.

The metadata in the CBFS file system includes: a superblock, an inode, a data block bitmap, an inode bitmap, an IB, a VBM, a BMD, and a journal. Update frequencies of the metadata can be classified into a corresponding number of levels according to the number of streams supported by the storage device (for example, 4 or any other appropriate values). For example, in a specific example, the storage device supports at least four streams, and then the update frequencies of the metadata can be classified into four levels, i.e.,

| Stream | Data |
| --- | --- |
| Journal stream | Journal |
| IB stream | IB |
| VBM stream | VBM |
| Other streams | Superblock, inode, block bitmap, and BMD |

The journal stream corresponds to a SHORT level, the IB stream corresponds to a MEDIUM level, the VBM stream corresponds to a LONG level, and other streams correspond to an EXTREME level. In addition, SHORT corresponds to stream ID 1, MEDIUM corresponds to stream ID 2, LONG corresponds to stream ID 3, and EXTREME corresponds to stream ID 4. When a user does not explicitly specify an update frequency of the data, stream ID 0 is used finally by default.

The file system manages IO requests for the metadata and file data by using a block buffer as an interface. Therefore, a field can be added to the block buffer to describe the life cycle corresponding to data buffered in the block buffer. The initial value of the field is set to 0, that is, the stream ID 0 is used. When the modified metadata is written to the storage device, this field of the corresponding buffer is set to map the various metadata of the CBFS file system to the four levels described previously.

The file system can send the data and its levels to an underlying storage drive, which maps the levels of the update frequencies of the data to the corresponding stream IDs and stores the stream IDs in the corresponding field, for sending the write request to the storage device for processing.

In some embodiments, other multilayer structures are further included between the file system and the storage drive. For example, the CBFS passes the data and its levels to a multi-core cache (MCC) in the next layer. Then, the MCC sends the data to a redundant array of independent disks (RAID), for example, a mapped RAID. Other packet information, for example, a start LBA address, a length, and a flag (including a data flag), is filled in the mapped RAID, and then a write request is sent to the underlying storage drive. The storage drive (such as an NVMe drive) then maps the levels of various pieces of data to the corresponding stream IDs, stores the stream IDs in a specific field of a directive of a write command, and passes the write command to the storage device for processing. The FTL on the storage device then performs subsequent processing.

The specific embodiment of the present disclosure is introduced above with reference to a CBFS file system and an NVMe memory. According to the embodiment of the present disclosure, a WAF parameter can be reduced, thereby increasing the effective life of a storage device. In addition, the WAF parameter may also affect the performance of read and write operations, and therefore, the reduction of the WAF parameter also improves the read and write performance of the storage system.

Figure 4:
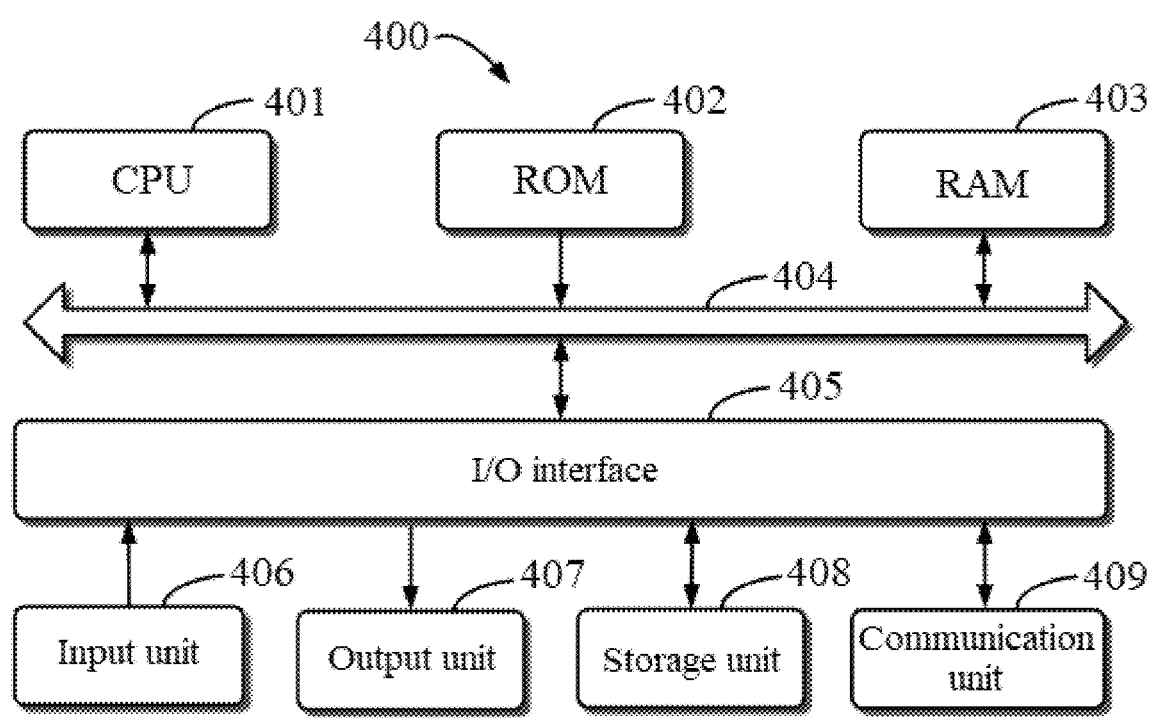
FIG. 4 is a schematic block diagram of an example device that can be configured to implement an embodiment of the present disclosure according to some embodiments of the present disclosure.

FIG. 4 is a schematic block diagram of device 400 that can be configured to implement an embodiment of the present disclosure. As shown FIG. 4, device 400 includes central processing unit (CPU) 401 that may perform various appropriate actions and processing according to computer program instructions stored in read-only memory (ROM) 402 or computer program instructions loaded from storage unit 408 to random access memory (RAM) 403. Various programs and data required for the operation of device 400 may also be stored in RAM 403. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, and a wireless communication transceiver. Communication unit 409 allows device 400 to exchange information/data with other devices over a computer network such as the Internet and/or various telecommunication networks.

The various processes and processing described above, for example, method 300, may be performed by processing unit 401. For example, in some embodiments, method 300 may be implemented as a computer software program that is tangibly included in a machine-readable medium such as storage unit 408. In some embodiments, some or all of the computer programs may be loaded and/or installed onto device 400 via ROM 402 and/or communication unit 409. When the computer program is loaded into RAM 403 and executed by CPU 401, one or more steps of method 300 described above may be implemented.

The present disclosure may be a method, an apparatus, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++ as well as conventional procedural programming languages such as the "C" language or similar programming languages. The computer-readable program instructions may be executed completely on a user's computer, partially on a user's computer, as a separate software package, partially on a user's computer and partially on a remote computer, or completely on a remote computer or server. In the case where a remote computer is involved, the remote computer may be connected to a user computer over any kind of networks, including a local area network (LAN) or wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit can execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be appreciated that each block in the flowcharts and/or block diagrams and a combination of blocks in the flowcharts and/or block diagrams may be implemented by computer program instructions.

The computer-readable program instructions may be provided to a processing unit of a general purpose computer, a special purpose computer, or another programmable data processing apparatus to produce a machine such that the instructions, when executed by the processing unit of the computer or another programmable data processing apparatus, generate an apparatus for implementing the functions/actions specified in one or more blocks in the flowchart and/or block diagrams. The computer-readable program instructions may also be stored in a computer-readable storage medium, and the instructions cause the computer, another programmable data processing apparatus, and/or other devices to work in a specific manner, such that the computer-readable medium storing the instructions includes an article of manufacture including instructions for implementing various aspects of functions/actions specified in one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible embodiments of systems, methods, and computer program products according to multiple embodiments of the present disclosure. In this regard, each block in the flowcharts or block diagrams may represent a module, a program segment, or a portion of an instruction that includes one or more executable instructions for implementing the specified logical functions. In some alternative implementations, functions labeled in the blocks may occur in an order different from that as labeled in the accompanying drawings. For example, two successive blocks may actually be performed basically in parallel, or they may be performed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above. The foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements of technologies on the market, or to enable other persons of ordinary skill in the art to understand the embodiments disclosed here.

The invention claimed is:

1. A method for data storage, comprising:
   selecting a stream from a plurality of streams having respective update frequencies, the update frequency of the selected stream matching an update frequency of to-be-written data, wherein a total number of streams in the plurality of streams is equal to a total number of streams supported by a solid state storage device;
   determining a label of the data that both i) is a label of the selected stream and ii) indicates one of a plurality of update frequency levels, wherein a total number of update frequency levels in the plurality of update frequency levels is equal to the total number of streams in the plurality of streams, wherein each update frequency level corresponds to a respective one of a plurality of types of metadata; and
   sending a write request for the data to a storage drive, at least in part by a file system setting a field of a block buffer that stores the data to the label of the data, so that the storage drive stores a stream identifier corresponding to the stream identified by the label of the data into the field of the block buffer and then sends the write request to the solid state storage device to cause the solid state storage device to perform a write operation for the data based on the stream identified by the stream identifier.

2. The method of claim 1, wherein the data comprises metadata, and selecting the stream from the plurality of streams comprises:
   selecting the stream based on a type of the metadata, wherein the type of the metadata is associated with an update frequency of the metadata.

3. The method of claim 2, wherein selecting the stream from the plurality of streams comprises:
   selecting a first stream in the plurality of streams as the stream in response to determination that the type of the metadata is a journal;
   selecting a second stream in the plurality of streams as the stream in response to determination that the type of the metadata is a virtual block mapping (VBM);
   selecting a third stream in the plurality of streams as the stream in response to determination that the type of the metadata is an indirect block (IB); and
   selecting a fourth stream in the plurality of streams as the stream in response to determination that the type of the metadata is a superblock, a bitmap, or a per-block metadata (BMD).

4. The method of claim 1, wherein the storage drive comprises a fast non-volatile memory (NVMe) storage drive.

5. The method of claim 1, wherein each update frequency level has a single corresponding one of the plurality of streams.

6. The method of claim 1,
   wherein the stream identifier is one of a plurality of stream identifiers;
   wherein a total number of stream identifiers in the plurality of stream identifiers is equal to the total number of streams in the plurality of streams; and
   wherein a total number of update frequency levels in the plurality of update frequency levels is equal to the total number of streams in the plurality of streams.

7. The method of claim 6, further comprising:
   classifying individual types of metadata into the plurality of update frequency levels, based on update frequencies of the individual types of metadata, wherein each individual type of metadata is classified into one of the update frequency levels in the plurality of update frequency levels.

8. An electronic device, comprising:
   a processor; and
   a memory coupled to the processor and comprising instructions stored thereon, wherein when executed by the processor, the instructions cause the electronic device to perform actions comprising:
      selecting a stream from a plurality of streams having respective update frequencies, the update frequency of the selected stream matching an update frequency of to-be-written data, wherein a total number of streams in the plurality of streams is equal to a total number of streams supported by a solid state storage device;

determining a label of the data that both i) is a label of the selected stream and ii) indicates one of a plurality of update frequency levels, wherein a total number of update frequency levels in the plurality of update frequency levels is equal to the total number of streams in the plurality of streams, wherein each update frequency level corresponds to a respective one of a plurality of types of metadata; and sending a write request for the data to a storage drive, at least in part by a file system setting a field of a block buffer that stores the data to the label of the data, so that the storage drive stores a stream identifier corresponding to the stream identified by the label of the data into the field of the block buffer and then sends the write request to the solid state storage device to cause the solid state storage device to perform a write operation for the data based on the stream identified by the label.

9. The electronic device of claim 8, wherein the data comprises metadata, and selecting the stream from the plurality of streams comprises:

selecting the stream based on a type of the metadata, wherein the type of the metadata is associated with an update frequency of the metadata.

10. The electronic device of claim 9, wherein selecting the stream from the plurality of streams comprises:

selecting a first stream in the plurality of streams as the stream in response to determination that the type of the metadata is a journal;

selecting a second stream in the plurality of streams as the stream in response to determination that the type of the metadata is a virtual block mapping (VBM);

selecting a third stream in the plurality of streams as the stream in response to determination that the type of the metadata is an indirect block (IB); and selecting a fourth stream in the plurality of streams as the stream in response to determination that the type of the metadata is a superblock, a bitmap, or a per-block metadata (BMD).

11. The electronic device of claim 8, wherein the storage drive comprises a fast non-volatile memory (NVMe) storage drive.

12. A computer program product having a non-transitory computer readable medium which stores a set of instructions to perform data storage; the set of instructions, when carried out by computerized circuitry, causing the computerized circuitry to perform a method of:

selecting a stream from a plurality of streams having respective update frequencies, the update frequency of the selected stream matching an update frequency of to-be-written data, wherein a total number of streams in the plurality of streams is equal to a total number of streams supported by a solid state storage device;

determining a label of the data that both i) is a label of the selected stream, and ii) indicates one of a plurality of update frequency levels, wherein a total number of update frequency levels in the plurality of update frequency levels is equal to the total number of streams in the plurality of streams, wherein each update frequency level corresponds to a respective one of a plurality of types of metadata; and sending a write request for the data to a storage drive, at least in part by a file system setting a field of a block buffer that stores the data to the label of the data, so that the storage drive stores a stream identifier corresponding to the stream identified by the label of the data into the field of the block buffer and then sends the write request to the solid state storage device to cause the solid state storage device to perform a write operation for the data based on the stream identified by the label.

13. The computer program of claim 12, wherein the data comprises metadata, and selecting the stream from the plurality of streams comprises:

selecting the stream based on a type of the metadata, wherein the type of the metadata is associated with an update frequency of the metadata.

14. The computer program of claim 13, wherein selecting the stream from the plurality of streams comprises:

selecting a first stream in the plurality of streams as the stream in response to determination that the type of the metadata is a journal;

selecting a second stream in the plurality of streams as the stream in response to determination that the type of the metadata is a virtual block mapping (VBM);

selecting a third stream in the plurality of streams as the stream in response to determination that the type of the metadata is an indirect block (IB); and selecting a fourth stream in the plurality of streams as the stream in response to determination that the type of the metadata is a superblock, a bitmap, or a per-block metadata (BMD).

15. The computer program of claim 12, wherein the storage drive comprises a fast non-volatile memory (NVMe) storage drive.

\* \* \* \* \*